Patented June 5, 1951

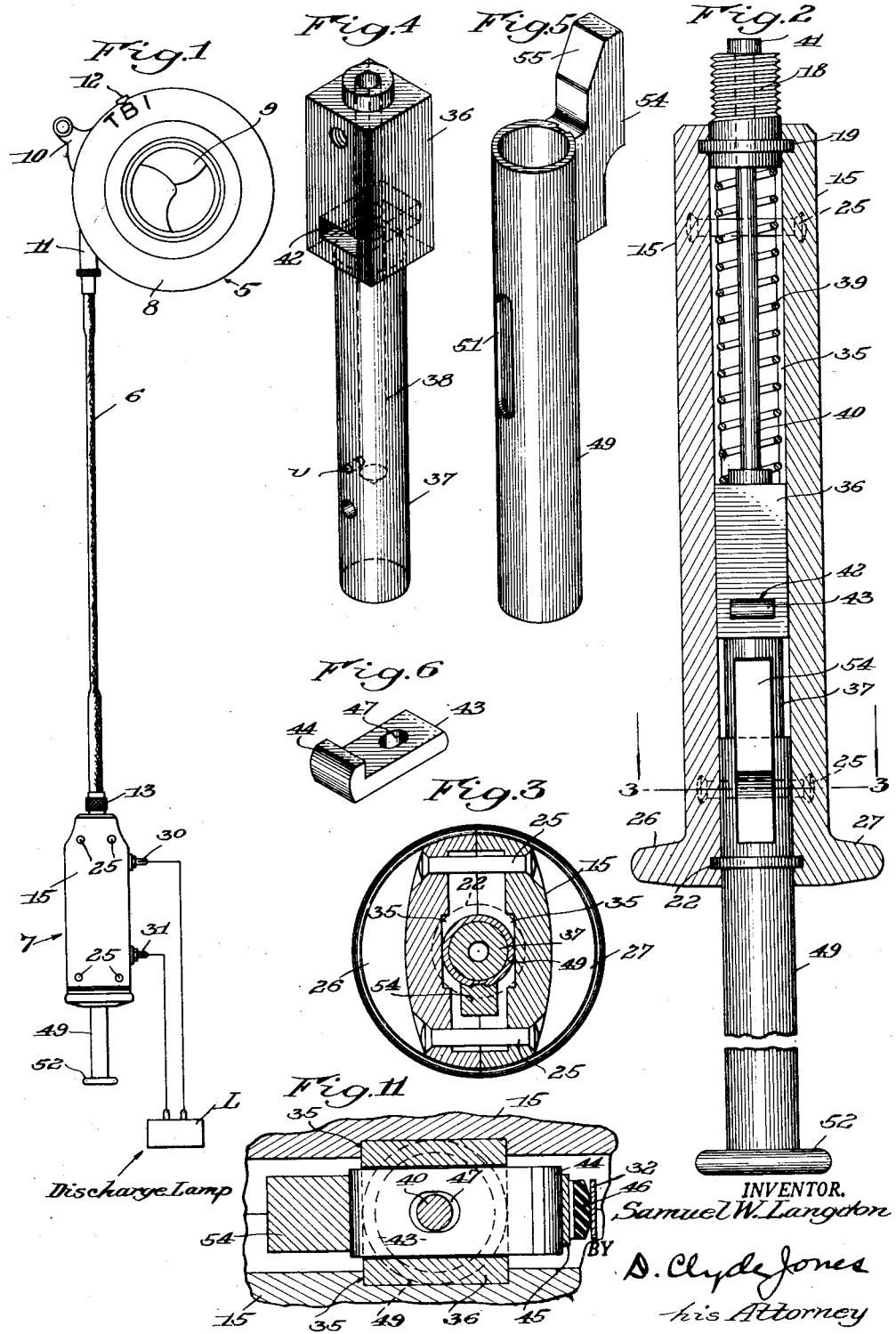

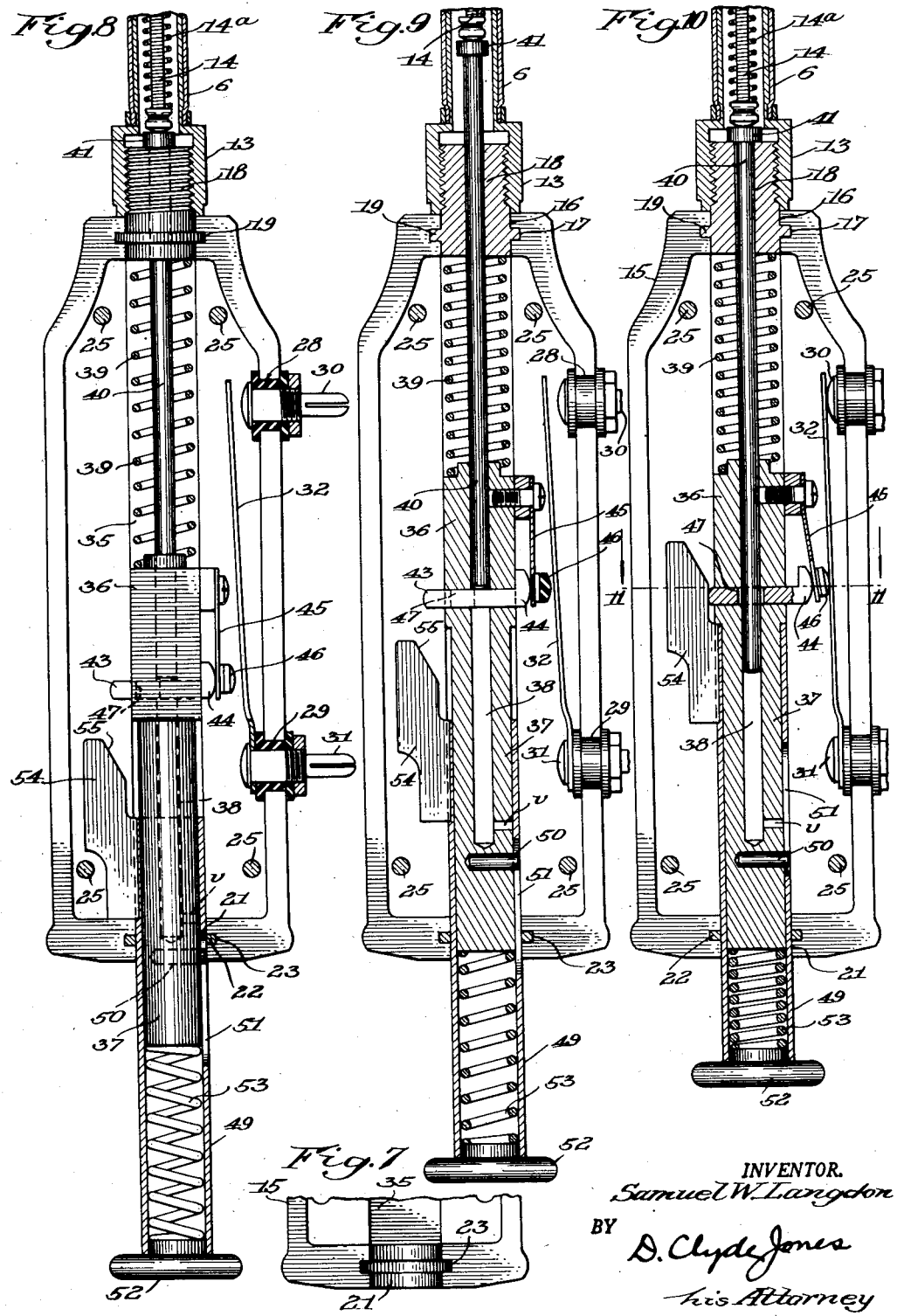

2,555,495

UNITED STATES PATENT OFFICE 2,555,495

CAMERA SHUTTER AND FLASHLIGHT SYNCHRONIZER

Samuel W. Langdon, Rochester, N. Y.

Application June 4, 1947, Serial No. 752,413

4 Claims. (Cl. 95—11.5)

This invention relates to a timing device or synchronizer for coordinating the operation of a camera shutter with the firing of a light source such as a flash bulb or discharge lamp so that the light source will be at its optimum intensity during the brief interval that the shutter is open.

This application is a continuation in part of application Serial No. 663,384, filed April 19, 1946, and now abandoned.

The present invention has for its purpose an improvement in the mentioned type of synchronizing mechanism which obviates the need of exacting adjustments on the part of the user, which provides a simple construction and which affords a higher degree of reliability as compared with prior devices of this kind.

In accordance with the main feature of the present invention, there is provided a synchronizer for a camera shutter and for a light source wherein a camera shutter set in its so-called "bulb" position for non-fixed cycle operation under the control of a cable release, is operated by a control unit including a manually operated member, which unit also energizes the light source in synchronism with that period of time during which the shutter is at maximum aperture, the restoration of the cable release with the consequent closure of the shutter being effected independently of the manual member.

The various features and advantages of the invention will appear from the detailed description and claims when taken with the drawings in which:

Fig. 1 is a view showing a camera shutter and a light source, together with a cable release for actuating the camera shutter and also showing an external view of the synchronizer;

Fig. 2 is a longitudinal section through the synchronizer showing its several parts in their normal position;

Fig. 3 is a cross-section taken substantially on the line 3—3 of Fig. 2;

Fig. 4 is a perspective view of the synchronizer plunger;

Fig. 5 is a perspective view of the tubular member which carries an actuating cam;

Fig. 6 is a perspective view of a latch which controls the downward movement of the actuating rod;

Fig. 7 is an enlarged fragmentary view of the lower part of one-half of the casing;

Fig. 8 is a side elevation of the synchronizer with one-half of the casing removed and with the cable release, as well as the actuating plunger of the synchronizer, also shown in section, the parts being illustrated in their normal position;

Fig. 9 is a similar view of the synchronizer showing its several parts in the position which they occupy at approximately the time that the camera shutter is tripped by the cable release;

Fig. 10 is a view similar to that of Fig. 8 except that the parts of the synchronizer are illustrated in the positions which they occupy after the shutter has been opened to its maximum aperture and then closed and after the cable release has been restored, as well as after the firing circuit for the light source has been completed; and Fig. 11 is a cross-section taken substantially on the line 11—11 of Fig. 10 illustrating the position of the latch and its related parts in the position which they occupy at approximately the time that the firing circuit is completed.

Referring first to Fig. 1, there is illustrated a camera shutter generally designated 5, a cable release 6 for the camera shutter and a synchronizer 7 for coordinating the operation of the camera shutter with the firing of a light source L. The light source is preferably of the arc discharge bulb type, such as the "Kodatron" now being offered for sale by the Eastman Kodak Company. The shutter comprises a casing 8, shutter blades 9, a shutter release trip lever 10 and a cable release socket 11 which receives the upper end of the cable release 6 of known construction. The shutter case is provided with the usual legends T (time), B (bulb) and I (instantaneous), indicating the different settings of the shutter and is also provided with a pointer or index 12 movable with reference to the legends, to set the shutter. As indicated in Fig. 1 the pointer is shown set for bulb operation.

The synchronizer 7 is enclosed in a cylindrical casing 15 generally elliptical in cross section which casing is preferably molded or otherwise formed in two halves as indicated in Fig. 3. The upper ends of the two halves of the casing define a circular opening 16 surrounded by an annular recess 17 to receive an externally threaded ferrule 18. This ferrule is screwed into the coupling 13 at the lower end of the cable release 6. A shoulder 19 on the ferrule engages the recess 17 to insure registry of the two parts of the casing. The lower ends of the two halves of the casing likewise define a circular opening 21 in alinement with said first mentioned opening, the circular opening 21 being surrounded by an annular alining recess 23 to receive a washer 22. This shoulder 19 on the ferrule 18 and the washer 22 mate with the annular recesses 17 and 23 to hold the two halves of the casing in registry when they are fastened together by the rivets 25. The lower end of the casing (Figs. 2 and 3) is formed with finger grips 26 and 27 for a purpose to be set forth. The right-hand side (Fig. 8) of the mating halves of the casing define openings 28 and 29 in which electrical pin terminals 30 and 31 are insulatedly mounted. A leaf spring 32 of electrically conducting material, is secured under the head of the pin terminal 31 in electrical contact therewith. This spring extends upward so that it can be swung into contact with the head of the pin terminal 30 whereby it serves as a normally open switch in the firing circuit of the light source L (Fig. 1).

The two halves of the casing are made with opposing longitudinal channels 35 (Figs. 2 and 3) to function as a rectangular guide for the rectangular portion 36 of a plunger which is longitudinally movable therein. The lower portion 37 of the plunger is cylindrical. The plunger is provided with a longitudinal bore 38 extending through the rectangular portion of the plunger into the cylindrical portion thereof. A vent $v$ leading to the bore permits the escape of air therefrom. This bore is adapted to receive an actuating rod 40 which moves through the ferrule 18 and terminates in a head 41 to operate the cable 14 of the cable release 6. The rectangular portion of the plunger is provided with a transverse rectangular opening 42 therethrough which intersects the bore 38. The rectangular opening receives a latch 43 having a head 44 that normally engages the right side of the plunger as shown in Fig. 9 in which position it limits the downward movement of the actuating rod 40. The latch is normally held in this position by a flat spring 45 fastened at its upper end by a screw to the plunger. The lower end of this spring has its rear surface engaging the head 44 of the member 43 while the front surface of this end of the spring is provided with an insulating button 46. Button 46, when the spring 45 is actuated toward the right, as indicated in Fig. 10, forces the upper end of the leaf spring 32 against the head of the upper pin terminal 30 to close the mentioned firing circuit. However, the latch 43 has an opening 47 (Fig. 6) therethrough which is adapted to register with the bore 38 when the latch is moved to the right as shown in Fig. 10, thereby permitting the actuating rod 40 to pass through the opening 47 into the lower part of the bore 38 after the shutter has been tripped. Spring 14a which surrounds the cable 14 of cable release 6, restores the cable and in turn restores the shutter blades 9 as well as rod 40.

A coil spring 39 which encircles the actuating rod 40, has one of its ends engaging the under side of the ferrule 18 and has its other end engaging the upper end of the plunger 36 to insure the restoration of the plunger to its normal position, as shown in Fig. 8. The cylindrical portion of the plunger has mounted thereon for telescopic movement, an actuating tube 49 which slides in the washer 23 and which projects through the lower end of the casing. The plunger has fixed therein a pin 50 which projects laterally therefrom into a slot 51 extending longitudinally in the tube. This pin and slot prevent relative rotary movement between the plunger and the tube, but permit relative longitudinal movement of these parts between the positions shown in Figs. 9 and 10. The lower end of the tube terminates in a button 52 that can be depressed by the user's thumb while his index and middle fingers respectively engage the ribs or finger grips 26 and 27 on the lower end of the casing. A restoring coil spring 53 is enclosed within the tube 49, which spring has its respective ends engaging the inner surface of the button 52 and the lower end of the plunger. This spring assures the return of the plunger and tube to their relative positions shown in Fig. 8. It should be pointed out that the spring 53 is considerably stronger than the spring 39 so that the spring 39 will be compressed to actuate the cable release and in turn the camera shutter, before the lower spring 53 is compressed in the course of closing the mentioned firing circuit for the light source.

The upper portion of the tube 49 has fastened to the outside thereof a cam member 54 provided with a cam surface 55 which is adapted to engage the left end of the sliding latch 43 to force this latch to the position shown in Fig. 10. In this position, the opening in the latch 43 is in registry with the bore so that the actuating rod 40 for the cable release can restore to its normal position. Also in this position the insulating button 46 on the flat spring 45 forces the leaf spring 32 to contact the upper pin terminal 30 and thereby close the firing circuit of the light source.

In the operation of the synchronizer, the user grasps the synchronizer casing with his index and middle fingers, respectively, engaging the finger grips 26, 27, and with his thumb engaging the button 52 (Fig. 2). At this time, the several parts of the synchronizer are in the position shown in Fig. 8.

When an exposure is to be made, the user presses his thumb against the button 52 to force the actuating tube 49 into the casing. Since the coil spring 53 is much stronger than the coil spring 39, there will be substantially no relative movement between the actuating tube 49 and the plunger. However, these parts will move upward as a unit, meanwhile compressing the spring 39 to the position shown in Fig. 9. During this upward movement of these parts, the lower end of the actuating rod 40 engages the latch 43. Consequently, the rod is moved upward so that its head 41, forces the cable 14 of the cable release to open the shutter blades 9.

On the further depression of the button 52, after the limit of travel requisite to open the shutter, the spring 53 becomes compressed to permit the tubular member 49 to telescope on part 37 of the plunger while part 37 remains substantially stationary. As the tubular member 49 is thus moved upward, the surface 55 of the cam 54 carried thereon, forces the latch 43 to the right as shown in Fig. 10. In this position, the head 44 of the latch forces the flat spring 45 and its insulating button 46 against the leaf spring 32 until spring 32 contacts the terminal 30. This closes the firing circuit of light source L. Also, while the latch 43 is in the last-mentioned position, the opening 47 in the latch 43 is in registry with the bore 38 so that the actuating rod 40 can pass through the latch and into the lower part of the bore 38 (Fig. 10). This causes the rod 40 to remove pressure from the end of the cable 14 of the cable release 6, so that spring 14a restores the cable 14 permitting the shutter blades 9 to close and causing rod 40 to restore. However, this closure of the shutter blades takes place after the light source has been fired. When the user now removes his thumb from the button 52, the springs 39 and 53, restore the several parts of the synchronizer to the respective normal positions shown in Fig. 8.

The synchronizing device of the present invention will function with the various conventional light sources without changes in the adjustment of the device by the user, to accommodate for various degrees of "lag" in such light sources.

The present synchronizing device is substantially free from position error, that is, the device will operate the shutter without changing the timing whether the cable of the cable release is operated while straight throughout its length or whether it is arched.

While the present synchronizer has been shown in combination with a cable release for actuating the shutter, it will be understood that the invention is not limited to this arrangement. Instead, the head 41 of the actuating rod 40, can operate the shutter 5 directly, for example, by engaging the release trip lever 10 thereof.

What I claim is:

1. A device for synchronizing the completion of the electrical operating circuit of a light source with the operation of a camera shutter set in "bulb" position for actuation by means of a cable release, in combination a rod longitudinally movable for actuating the cable release, a plunger having a bore therein adapted to receive said rod, a latch extending across said bore to limit movement of said rod therein, a tubular member adapted first to move as a unit with said plunger to move said rod and then to telescope on said plunger, cam means on said member serving to force said latch out of the way of said rod so that the rod can further enter the bore and thereby disengage the cable release for the release thereof, and means actuated by said latch for closing said circuit.

2. A device for synchronizing the completion of the electrical operating circuit of a light source with the operation of a camera shutter set in "bulb" position for actuation by means of a cable release, in combination a rod longitudinally movable for actuating the cable release, a plunger having a bore therein adapted to receive said rod, a latch extending across said bore to limit movement of said rod therein, a tubular member adapted first to move as a unit with said plunger to move said rod and then to telescope on said plunger, cam means on said member serving to force said latch out of the way of said rod so that the rod can further enter the bore and thereby disengage the cable release for the release thereof, and means including said cam means for closing said circuit.

3. A device for synchronizing the closure of the operating circuit of a light source with the operation of a camera shutter set in "bulb" position and actuated through the use of a cable release, in combination a casing, a rod extending through one end of said casing for actuating the cable release, a plunger having a bore therein intersected by a transverse opening, a latch in said opening extending across said bore, said rod being normally spring urged into contact with said latch, a spring normally maintaining said plunger in predetermined spaced relation with respect to the mentioned end of said casing, a second spring of considerably greater strength than said first spring interposed between said plunger and said tubular member, to maintain a normal space relation therebetween, cam means on said member serving to force said latch out of the way of rod, and means actuated by said latch for closing said circuit.

4. A device for synchronizing the closure of the operating circuit of a light source with the operation of a camera shutter set in "bulb" position and actuated through the use of a cable release, in combination a casing, a shutter operating rod extending through the casing, a reciprocable actuating element relatively movable lengthwise of said operating rod, a shiftable stop carried by said actuating element and engageable with said rod to transmit motion of said actuating element thereto in one direction to open the shutter, a reciprocable operating member relatively movable lengthwise of said actuating element, resilient means normally biasing said operating member and said actuating element against relative movement in one direction and serving to transmit motion of said operating member to said actuating element, and means including a part carried by said operating member for shifting said stop to disengage said rod thereby closing the shutter and for completing said circuit upon movement of said operating member relative to said actuating element against the biasing action of said resilient means.

SAMUEL W. LANGDON.

REFERENCES CITED

The following references are of record in the file of this patent:

UNITED STATES PATENTS

| Number | Name | Date |
| --- | --- | --- |
| 1,214,700 | Marks | Feb. 6, 1917 |
| 1,913,848 | Miskella | June 13, 1933 |
| 2,238,115 | Johnson | Apr. 15, 1941 |
| 2,395,500 | Oswald | Feb. 26, 1946 |

FOREIGN PATENTS

| Number | Country | Date |
| --- | --- | --- |
| 520,811 | Great Britain | May 3, 1940 |